Feb. 2, 1971          A. G. PROFET          3,559,499

SELF-CONTAINED MECHANICAL ACTUATOR

Filed Sep. 15, 1969          3 Sheets-Sheet 1

INVENTOR
ANTHONY G. PROFET

BY Richards & Shefte

ATTORNEYS

INVENTOR
ANTHONY G. PROFET

Feb. 2, 1971  A. G. PROFET  3,559,499
SELF-CONTAINED MECHANICAL ACTUATOR
Filed Sept. 15, 1969  3 Sheets-Sheet 3
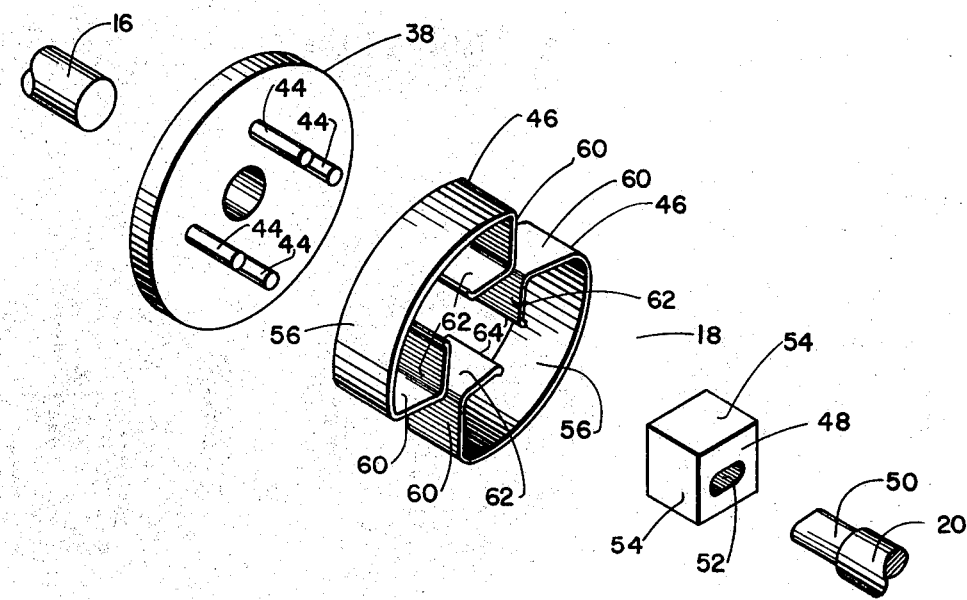
FIGURE 4
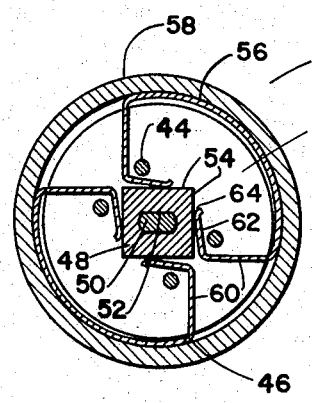   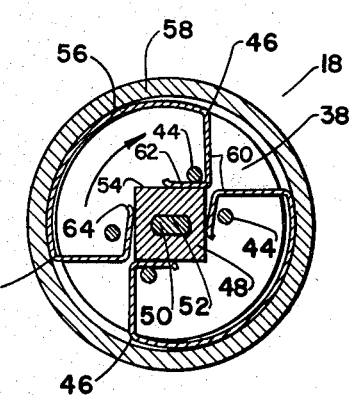   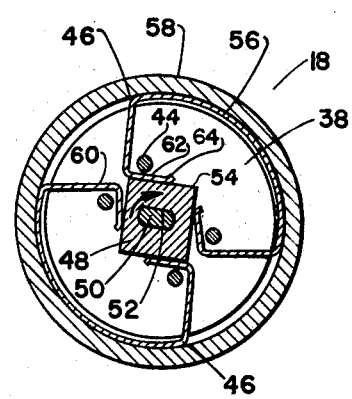
FIGURE 5   FIGURE 6   FIGURE 7
INVENTOR
ANTHONY G. PROFET
BY Richards & Shefte
ATTORNEYS United States Patent Office 3,559,499
Patented Feb. 2, 1971

3,559,499
SELF-CONTAINED MECHANICAL ACTUATOR
Anthony G. Profet, Charlotte, N.C., assignor to Duff-Norton Company, Inc., Charlotte, N.C., a corporation of North Carolina
Filed Sept. 15, 1969, Ser. No. 857,911
Int. Cl. F16h 1/18, 57/00
U.S. Cl. 74—424.8                                    11 Claims

ABSTRACT OF THE DISCLOSURE

A self-contained mechanical actuator of the jackscrew-type that includes a drive motor secured to a housing with a drive shaft projecting from the motor into the housing for driving a high-efficiency skew-axis, screw-type gear set to which is connected a screw member having a double helix screw thread formed at a high helix angle for high-efficiency manipulation of a load-attached travelling nut member. The gear set includes a pinion shaft carrying a pinion that has worm-like screw teeth, and a gear with teeth formed on a generally radial face for multiple tooth, face-meshing engagement with the pinion teeth. The pinion shaft is coaxially aligned with the drive shaft along an axis compactly disposed proximate the rotational axis of the gear and screw member. A self-locking transmission mechanism drivingly interconnects the drive shaft and the gear set pinion shaft for substantially drag-free transmission of rotation to the gear set and connected screw member while substantially preventing any overriding, reversing or rundown rotation independent of the rotation of the drive shaft by the motor. The pinion shaft and the screw member are supported in radial ball bearings for rotation and for transmitting axial thrust to the housing. Ends of the pinion shaft and screw member are radially journaled in the housing to form radial thrust transmitting bearing couples in cooperation with the respective radial ball bearings.

BACKGROUND OF THE INVENTION

The present invention relates to a self-contained mechanical actuator of the jackscrew-type, and more particularly to such an actuator that is compact, highly efficient and capable of manipulating loads rapidly and reliably without the occurrence of any significant overrun or rundown at the end of the operating strokes of the device.

Conventional actuators of this general type normally utilize a motor-driven worm gear set for rotating a screw member that has a single helix thread in meshing engagement with a travelling nut member to which a load is attached for axial manipulation upon rotation of the screw member. This use of a worm gear set and a single screw thread with a conventional helix angle results in an overall efficiency less than 50% so that the actuator is not self-lowering, but this relatively low efficiency requires a relatively large capacity drive motor to obtain desired speed and load handling capabilities. Moreover, the use of a conventional worm gear set, which may be combined with a self-locking transmission mechanism to prevent overrun, requires a relatively large housing to contain the components due to the substantial offset between the axes of the worm and gear, which also produces an imbalance in the operating relationship of the components.

In contrast, the self-contained mechanical actuator of the present invention utilizes a screw member having a high-efficiency, double helix thread with a relatively high helix angle, and a skew-axis, screw-type gear set of the face-meshing type that is characterized by high efficiency and a compact disposition of the axis of the pinion of the gear set proximate the axis of the gear. As a result, the overall efficiency of the actuator is significantly greater than conventional actuators for enhanced operating capabilities with corresponding drive motor capacities. Despite the increased efficiency, which is greater than 50%, self-lowering is prevented by the inclusion of a self-locking transmission mechanism that permits substantially drag-free transmission of drive rotation while substantially preventing any overrun, reversing or rundown rotation. In addition, the proximate disposition of the pinion axis and gear axis as well as the small capacity motor requirements to operate the high-efficiency mechanism results in a compact and well balanced arrangement.

Compactness and efficiency are further enhanced in the present invention by the use of radial ball bearing means disposed not only to support the screw member and pinion shaft for rotation, but also to serve as the sole means for transmitting axial thrust to the housing, thus eliminating the need for conventional axial thrust bearings. Furthermore, ends of the screw member and the pinion shaft are radially journaled in the housing to form radial thrust transmitting bearing couples in cooperation with the respective radial ball bearing means so that the size and capacity of the latter may be limited for compactness and low cost as compared to the requirements for bearings in conventional cantilever-type screw member and pinion shaft mountings.

SUMMARY OF THE INVENTION

Briefly described, the self-contained mechanical actuator of the present invention includes a housing to which a drive motor is secured, with a drive shaft driven by the motor and projecting therefrom into the housing. A skew-axis, screw-type gear set is disposed in the housing and has a pinion with worm-like screw teeth and a gear with teeth formed on a generally radial face thereof for multiple tooth, face-meshing engagement with the pinion teeth. The pinion is carried on a pinion shaft that is driven by the drive shaft for driving of the gear set, which, in turn, drives a screw member that has an end secured coaxially to the gear for rotation therewith and against axial movement with respect thereto. The screw member has a helically threaded exterior surface characterized by a relatively high helix angle, and a travelling nut member is mounted on the screw member with an interior threaded surface thereof mating with the screw member threaded surface to transmit rotation of the screw member into axial movement of the nut member. Means are mounted on the nut member for attaching a load thereto for manipulation of the load with the nut member. Rotation of the drive shaft is transmitted to the gear set for rotation of the screw member and manipulation of the load by a self-locking transmission mechanism disposed in the housing and interconnecting the drive shaft and the pinion shaft. This mechanism acts substantially drag-free to transmit rotation of the drive shaft into rotation of the gear set pinion while substantially preventing any overriding, reversing or rundown rotation of the gear set and screw member independent of the rotation of the drive shaft by the motor.

In the preferred embodiment of the present invention, the threaded surfaces of the screw and nut members are formed with double helix threads disposed at a relatively high helix angle for enhanced efficiency; the gear set has its pinion coaxially aligned with the drive shaft along an axis that is proximate the axis of the gear, which provides compactness and balance of the components; and a reversible electrical motor is used as a drive motor for reversible operation of the actuator, with the self-locking transmission mechanism transmitting rotation in either direction while substantially preventing any overriding, reversing or rundown rotation in either direction independent of the rotation of the drive shaft by the drive motor.

Thus, the present invention provides a self-contained mechanical actuator that is compact in construction and operates at a high efficiency to manipulate loads rapidly and reliably without being self-lowering and without permitting overrun or reversing independent of the drive motor rotation.

The preferred embodiment also includes gear and screw member radial ball bearing means having an outwardly facing inner race secured in relation to the gear and screw member for rotation therewith and against axial movement with respect thereto and an inwardly facing outer race secured to the housing against axial movement, with bearing balls disposed between the inner and outer races. The axial securement of the bearing means not only supports the gear and screw member for rotation, but also importantly provides for transmission of axial thrust from the gear and screw member in either direction to the housing. As a result, this radial ball bearing means may advantageously serve as the sole axial thrust bearing means for the gear and screw member, thus avoiding the necessity of the conventional use of a pair of oppositely acting thrust bearings. Further, the size and capacity of this radial bearing means necessary to handle radial thrust is minimized in comparison with a conventional cantilever mounting by radially journaling the end of the screw member in the housing, which may be accomplished by the use of a simple and inexpensive bushing, and which journaling in cooperation with the bearing means provides a bearing couple for transmitting radial thrust to the housing without concentrating all of the radial thrust at the radial ball bearing means. Preferably, this bearing arrangement is utilized in the above-described actuator, but it also can be used to advantage in other screw-type actuators.

If desired, a similar axially secured radial ball bearing means and radial end journaling arrangement may be used to support the pinion shaft for advantageous handling of axial and radial thrust, thereby eliminating all cantilever shaft mountings and minimizing the cost, size and capacity of bearings in the actuator for compactness and low cost without sacrificing reliability and efficiency.

BRIEF DESCRIPTION OF THE DRAWINGS

FIG. 4 is an enlarged exploded perspective view of the self-locking transmission mechanism incorporated in the actuator of FIGS. 1, 2 and 3; and FIGS. 5–7 are enlarged vertical sectional views of the self-locking transmission mechanism incorporated in the actuator of FIGS. 1, 2, 3 and 4 taken along line 5—5 of FIG. 2, and showing the components in their various operating positions.

DESCRIPTION OF THE PREFERRED EMBODIMENT

Figure 1:
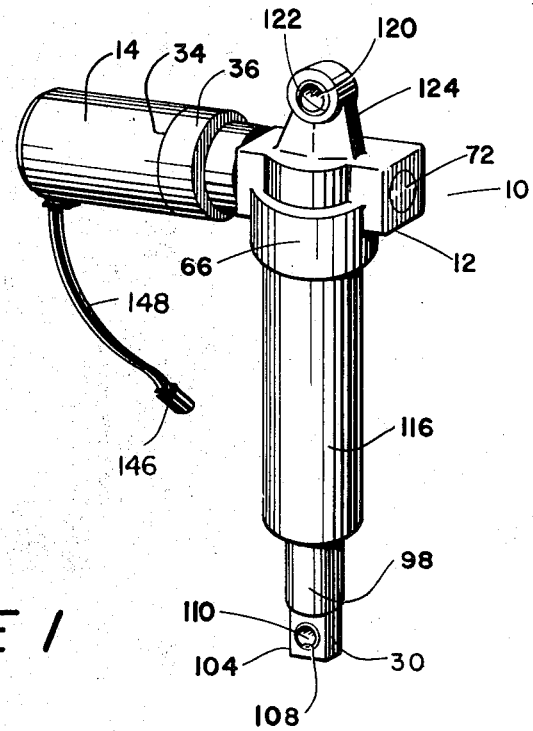
FIG. 1 is a perspective view of the preferred embodiment of the self-contained mechanical actuator of the present invention.
Figure 2:
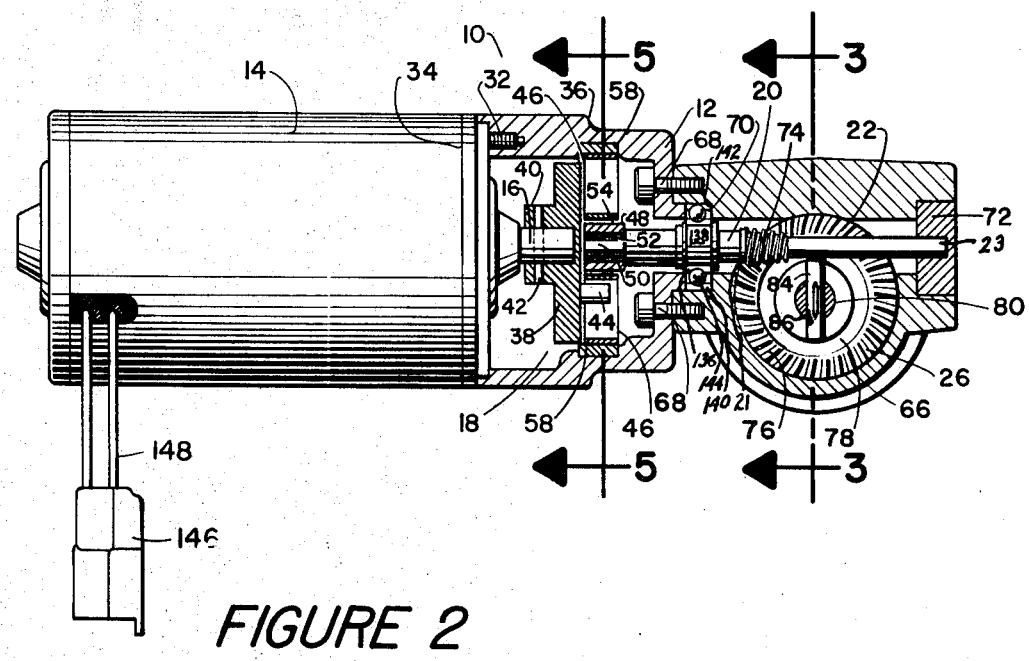
FIG. 2 is an enlarged end view, partially in section, of the actuator of FIG. 1.
Figure 3:
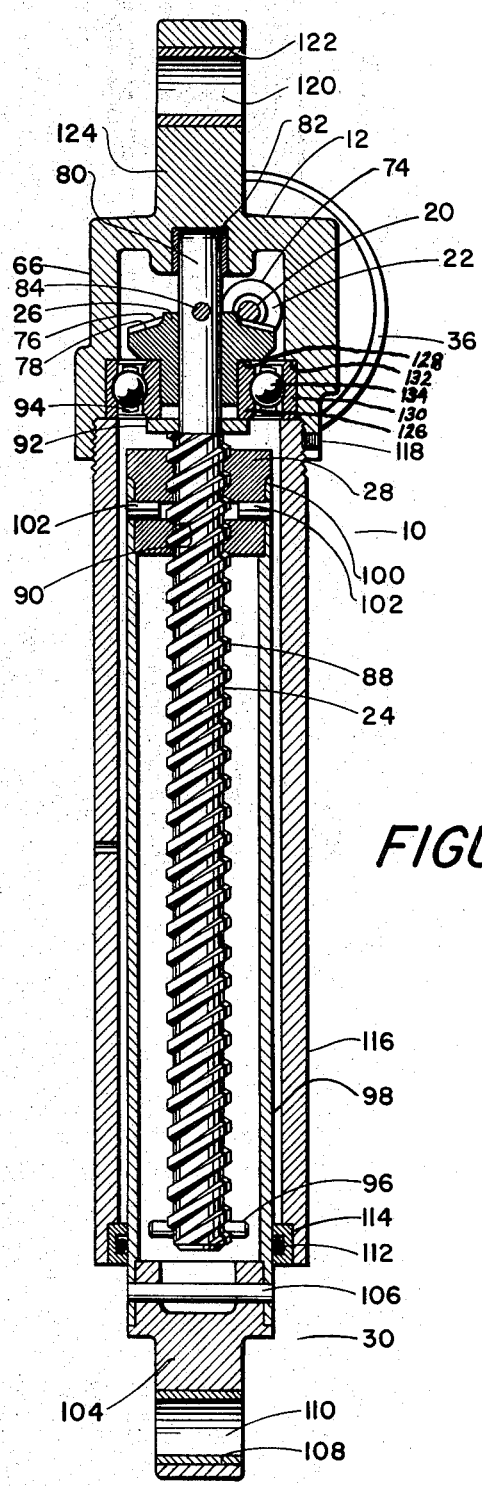
FIG. 3 is an enlarged vertical sectional view of the actuator of FIGS. 1 and 2 taken along line 3—3 of FIG. 2.

As illustrated in the accompanying drawings, the self-contained mechanical actuator 10 of the preferred embodiment of the present invention includes a housing 12 to which a drive motor 14 is secured. A drive shaft 16 is driven by the motor 14 and projects therefrom into the housing 12 for connection to a self-locking transmission mechanism 18 that is disposed in the housing 12 and interconnects the drive shaft 16 and the pinion shaft 20 of a gear set 22 for driving of the gear set by the motor 14. A screw member 24 is secured to the gear 26 of the gear set 22 for rotation coaxially therewith and has mounted thereon a travelling nut member 28 on which means 30 is mounted for attaching a load that is to be manipulated by the actuator 10.

The drive motor 14 is a reversible electrical motor of a conventional alternating current or direct current type, preferably a permanent magnet direct current type that provides an inherent braking of the drive shaft 16 when the motor is de-energized at the end of an operating stroke of the actuator 10. The motor 14 is secured by screws 32 to an open end 34 of a cylindrical portion 36 of the housing 12 with the drive shaft 16 projecting coaxially thereinto.

The self-locking transmission mechanism 18 is disposed coaxially within the cylindrical housing portion 36 and his a circular disc 38 with a central hub 40 on the side thereof facing the motor and in which hub 40 the outer end of the drive shaft 16 is secured by a spring pin 42 extending diametrically through both the hub 40 and drive shaft 16 to secure the disc 38 to the shaft 16 for rotation therewith. Projecting from the side of the disc 38 opposite the side facing the drive motor 14 and parallel with the axis of the drive shaft 14 are four drive studs 44 formed integrally with the disc 38 and extending parallel to and equally offset from the axis of the drive shaft 14, as best seen in FIGS. 4–7. These drive studs 44 are arranged in two pairs, with each pair cofunctioning with one of a pair of spring strips 46 and with a transmission block 48.

The transmission block 48 is connected to the pinion shaft 20 for rotating therewith by the seating of a flattened end 50 of the pinion shaft 20 in a similarly flattened bore 52 in the transmission block 48, with the block bore 52 and the pinion shaft 20 being coaxially aligned with the drive shaft 16 for rotation about a common axis. The transmission block 48 is symmetrical with respect to the drive shaft axis for diametrically symmetrical spring strip engagement.

The two spring strips 46 are identical and diametrically symmetrical, each being formed from flat thin strip stock to provide an arcuate central portion 56 shaped to conform to the inner surface of an annular wear liner 58 that is seated in the cylindrical housing portion 36, a pair of spacer portions 60 extending inwardly from the ends of the arcuate central portion 56 toward and generally perpendicular to the facing transmission block surfaces 54 at an offset from the surface centers, and a pair of inturned end portions 62 extending from the inner ends of the spacer portions 60 at an inclination to the facing transmission block surfaces 54 and terminating at outer edges 64 disposed for engagement by the surfaces 54 at an offset from the surface centers opposite the aforementioned spacer portion offset. The spacer portions 60 of each pair are oppositely offset with respect to their facing surface centers, as are also the inturned end portion outer edges 64.

Each pair of drive studs 44 is disposed within the space between the spacer portions 60 of its associated spring strip 48, and each drive stud 44 is disposed between an inturned end portion 62 and the arcuate central portion 56 of its associated spring strip 46, with the circular path of movement of the drive studs 44 upon rotation of the drive shaft 16 intersecting the inturned end portions 62 for engagement thereof by the drive studs 44.

When the actuator 10 is operated by energization of the drive motor 14 to rotate the drive shaft 16, the disc 38 will be rotated by the drive shaft 16, causing the drive studs 44 to move in their circular path, as shown by the arrow in FIG. 6. Upon initiation of this movement, the leading stud 44 of each pair engages the leading inturned end portion 62 of the associated spring strip 46, causing it to pivot about its outer edge engagement with the facing transmission block surface 54 into full contact with the surface 54. Continued movement of the drive studs 44 then acts through the leading inturned end portions 66 and the facing surfaces 54 to cause rotation of the transmission block 48 and connected pinion shaft 20. This pivoting of the leading inturned end portions 62 draws them and the leading spacer portions 60 inwardly, thereby pulling the spring strip arcuate central portions 56 inwardly away from the annular wear liner 58 to eliminate drag therebetween as the spring strips 46 are rotated with the transmission block 48 by the drive studs 44. Drag-free rotation of the spring strips 46 is further accomplished by the fact that, as the transmission block 48 rotates, the transmission block surfaces 54 facing the outer edges 64 of the trailing inturned end portions 62 advance circularly away from these trailing outer edges 64, thereby allowing the strips to follow freely the rotating action of the drive studs 44.

When the drive motor 14 imparts rotation in the direction opposite that shown in FIG. 6, the components of the transmission mechanism 18 function to transmit rotation in the same manner as described above, but in the opposite rotational direction, due to the symmetrical configuration of the components.

When the actuator 10 is stopped at the end of an operating stroke, the self-locking transmission mechanism 18 serves as a brake to prevent substantially any overriding or reversing rotation of the gear set 22 and connected screw member 24 within the design capabilities of the device. It also functions in the same way to prevent self-lowering or rundown of the load at a rate greater than that imposed by the drive motor. This braking action is illustrated in FIG. 7, which shows the transmission block 48 attempting to rotate in a clockwise direction, as indicated by the arrow, independent of rotation of the drive shaft 16. When this happens, the transmission block surfaces 54 facing the leading spring strip inturned end portions 62 attempt to advance and thereby apply outward pressure to these leading inturned end portions 62. This biases the leading inturned end portions 62 and spacer portions 60 outwardly, forcing the arcuate central portions 56 outwardly against the annular wear liner 58 to create a drag thereagainst. This drag tends to hold the spring strips 46 against rotation and thereby retains the trailing spacer portions 60 in a position for jamming between the liner 58 and the facing transmission block surfaces 54, which act in a direction generally aligned with the lengths of the trailing spacer portions 60, which jamming provides a positive stop against rotation of the transmission block 48. Thus, positive self-locking is obtained by the advantageous combination of both drag and jamming.

After the above-described drag and jamming conditions have been imposed, further or resumed rotation of the drive shaft 16 in either direction will cause the leading drive stud 44 of each pair to engage the leading inturnd end portion 62 of each spring strip 46, biasing them inwardly to rmove the drag condition, and moving the spring strips 46 wtih the drive studs 44, which pulls the trailing spacer portions 60 forwardly and the leading spacer portions 60 inwardly, and thereby breaks the jamming condition so that the spring strips 46 are again free to advance with the drive studs 44 substantially drag-free.

Thus, this self-locking transmission mechanism 18 interconnects the drive shaft 16 and the gear set pinion shaft 20 for drag-free transmission of rotation of the drive shaft 16 in either direction by the reversible drive motor 14 into corresponding rotation of the gear set 22 and connected screw member 24 to manipulate the nut member 28 and attached load while substantially preventing any overriding, reversing or rundown rotation of the gear set 22 and screw member 24 in either direction of rotation independent of the rotation of the drive shaft 16 by the drive motor 14.

This self-locking transmission mechanism 18 has been described herein in detail for purposes of illustration only. The specific details do not form a part of the present invention, except to provide an example of a mechanism that can be utilized in the overall combination of the actuator of the present invention. Other types of self-locking transmission mechanisms may be substituted within the scope of the present invention for this presently disclosed preferred embodiment, which is disclosed and claimed in copending U.S. patent application Ser. No. 857,789, filed Sept. 15, 1969.

As described hereinabove, the self-locking transmission mechanism 18 transmits drive rotation to the gear set pinion shaft 20, which extends in coaxial alignment with the drive shaft 16 through the cylindrical housing portion 36 into a gear set enclosing housing portion 66 that is secured by screws 68 to the cylindrical housing portion 36. The pinion shaft 20 is retained in axial position for rotation by radial ball bearing means 70 seated in the housing 12 intermediate the drive motor 14 and gear 26, and has its outer end 23 radially journaled in a radial bushing 72 seated in the housing beyond the gear 26. Intermediate the bearing means 70 and the bushing 72, the pinion shaft 20 carries a pinion 21 formed with tapered worm-like screw teeth 74 of constant lead and pressure angle for multiple tooth face-meshing engagement with teeth 76 formed on a generally radial face 78 of the gear 26. These gear teeth 76 are slightly curved and slightly inclined axially for effective meshing with the worm-like teeth 74 of the pinion 21. The face-meshing feature of this gear set 22 allows the pinion 21 and its shaft 20 to be disposed on an axis proximate the axis of rotation of the gear 26 for substantial compactness of the gear set in comparison with a conventional worm gear set, which gear set compactness in combination with the axial alignment of the pinion shaft 20 and drive shaft 16 provides compactness in the entire actuator as well as providing substantial balance of the components thereof.

The above-described high-efficiency, compact, skew-axis, screw-type gear set 22 is of the type disclosed in Saari U.S. Pats. No. 2,696,125 and No. 2,731,886, which is presently sold commercially under the trademark "Spiroid" by Illinois Tool Works of Chicago, Ill. Other equivalent high-efficiency, compact, skew-axis, screw-type gear sets could be substituted within the scope of the present invention for the gear set disclosed. For example, equivalent advantageous results may be obtained using a gear set of the type presently sold commercially under the trademark "Helicon" also by Illinois Tool Works.

The gear set 22 is drivingly connected to the screw member 24, which is secured coaxially to the gear 26 for rotation therewith and against axial movement with respect thereto, with the gear 26 and screw member 24 supported in the housing for rotation and against axial movement by radial ball bearing means 94 seated in the gear set enclosing housing portion 66.

The screw member 24 has a double helix screw thread 88 formed on the surface thereof at a relatively high helix angle for high-efficiency operation of the travelling nut member, which has an interior double helix thread 90 that mates with the screw member thread 88 to transmit rotation of the screw member 24 into axial movement of the nut member 28, with travel of the nut member 28 being limited at the outer end of the screw member by a stop pin 96 that extends through the screw member 24.

The means 30 for attaching a load to the actuator 10 is mounted on the nut member 28 and includes a translating tube 98 having its inner end seated on the nut member 28 against a shoulder 100 thereof and retained thereon by spring pins 102 extending radially through the tube 98 into the nut member 28. The tube 98 encloses the screw member 24 outwardly of the nut member 28 and extends beyond the outer end of the screw member 24. A load attaching block 104 is secured in the outer end of the tube 98 by a roll pin 106 extending diametrically through the block and tube, and the load attaching block 104 has cylindrical bore 108 disposed outwardly of the tube 98 transverse to the screw member axis and having a tubular bushing 110 seated therein for securement of a load to the actuator 10.

The tube 98 and attached load are stabilized in axial disposition during operation by an O ring 112 surrounding the tube 98 and retained in an annular guide bushing 114 secured to the outer end of a tubular dust shield sleeve 116 that has its inner end threaded in the gear set enclosing housing portion 66 and secured therein by a set screw 118. This sleeve 116 extends coaxially with the screw member 24 to an outer end at which the O ring 112 is disposed. Alternatively, a conventional rod wiper can be used in place of this O ring arrangement.

The actuator 10 is attached to a supporting structure at an annular bushing 120 seated transverse to and axially intersecting the screw member axis in a bore 122 in a projection 124 of the housing 12 beyond the screw member 24 and axially opposite the location of the load attaching block 104.

In operation, the actuator 10 is attached at the housing projection bushing 120 to a supporting structure, a load is attached at the block bushing 110, and the drive motor 14 is attached through a conventional reversing switch to an available power source by means of an electrical connector 146 attached to leads 148 extending from the drive motor 14. Energization of the motor 14 imparts rotation to the drive shaft 16, which rotation is transmitted through the self-locking transmission mechanism 18 into rotation of the gear set pinion shaft 20. The gear set 22 reduces the rate of rotation and increases the torque, and transmits it to the screw member 24, causing the nut member 28 to travel along the screw member 24 and thereby manipulate the load, with the load maintaining the nut member 28 against rotation through the connection at the block bushing 110 so that the nut member and load are caused to move axially.

When the drive motor 14 is de-energized, the self-locking transmission mechanism 18 prevents any overriding, reversing or rundown rotation, thereby retaining the load at its manipulated location. Reversal of the power to the drive motor 14 causes rotation of the components in a reverse direction for reverse manipulation of the load.

During operation, thrust is transmitted from the screw member 24 and gear 26 to the housing 12 by the aforementioned gear and screw member radial ball bearing means 94, which not only supports the gear 26 and screw member 24 for rotation, but also serves to transmit axial thrust. For this purpose, the bearing means 94 includes an outwardly facing inner race 126 seated on the gear 26 with one end thereof engaging a radial shoulder 128 formed on the gear 26 and the other end thereof engaged by an annular retaining element 92 that is mounted on the screw member 24. This retaining element 92 is retained in engagement with the inner race 126 by the end of the thread 88 on the screw member 24, which thread terminates at a short spacing from the gear 26. The inner end 80 of the screw member 24 extending from the termination of the thread 88 is of a diameter less than the major diameter of the thread so as to permit mounting of the retaining element 92 thereon in abutting relation to the end of the thread, and this unthreaded screw member inner end 80 extends coaxially through the gear 26 and therebeyond for radial journaling of its extremity in a radial bushing 82 that is seated in the gear set enclosing housing portion 66 in axial alignment with the screw member 24.

The gear 26, screw member 24, bearing means inner race 126 and retaining element 92 are secured in assembled relation for rotation together and against relative axial movement by a lock pin 84 extending diametrically through the screw member inner end 80 at the end of the gear 26 opposite the end at which the retaining element 92 is located. The ends of this lock pin 84 extend radially outward from the screw member inner end 80 and are seated in a diametrical recess 86 formed in the surface of the gear 26, which prevents rotation of the lock pin 84 with respect to the gear 26 and thereby secures the screw member 24 to the gear 26 for rotation therewith.

The gear and screw member radial ball bearing means 94 also includes an inwardly facing outer race 130 secured to the housing 12 against axial movement by abutment of one end thereof against a radial shoulder 132 of the gear set enclosing housing portion 66 and abutment of the outer end thereof against the inner end of the tubular sleeve 116 that is threadably secured in the gear set enclosing housing portion 66.

The inner and outer races 126 and 130, respectively, of the gear and screw member ball bearing means 94 are connected by bearing balls 134 disposed therebetween, which, thereby, support the gear 26 and screw member 24 for rotation and for transmitting axial thrust in either direction from the screw member 24 to the housing 12. Outward axial thrust of the screw member 24 is transmitted through the lock pin 84, gear shoulder 128, inner race 126, bearing balls 134 and outer race 130 to the housing 12, and inward axial thrust of the screw member is transmitted through the retaining element 92, inner race 126, bearing balls 134 and outer race 130 to the housing 12.

With this arrangement, only this single radial ball bearing means 94 is required to transmit axial thrust in either direction, which results in a more compact and less expensive construction than a conventional arrangement of a pair of opposed thrust bearings. Moreover, this arrangement also serves to transmit radial thrust in combination with the aforementioned radial journaling of the extremity of the screw member end 80 in the bushing 82, which is disposed at a spacing from the bearing means 94 for cooperation therewith to provide a bearing couple for transmitting radial thrust from the screw member 24 to the housing 12. Thus, the size and capacity of the bearing means 94 need not be as great as that required to handle radial thrust in a conventional cantilever bearing support wherein the end of the rotating shaft is unsupported, and only a simple bushing 82 is required in addition to the ball bearing means 94.

This same type of bearing arrangement is provided for rotatably supporting and for transmitting the thrust of the pinion shaft 20. This is provided by the aforementioned pinion shaft radial ball bearing means 70 which includes an outwardly facing inner race 136 secured in a double shouldered collar 138 that is fixed to the pinion shaft 20 for securement of the inner race 136 to the pinion shaft 20 for rotation therewith and against axial movement with respect thereto, an inwardly facing outer race 140 secured in the housing 12 against axial movement by abutment of one end thereof against a radial shoulder 142 of the gear set enclosing housing portion 66 and abutment of the other end thereof against the inner end of the cylindrical housing portion 36, and bearing balls 144 disposed between the inner and outer races 136 and 140, respectively, and rotatably connecting the races for supporting the pinion shaft for rotation and for transmitting axial thrust in either direction from the pinion shaft 20 to the housing 12.

This pinion shaft radial ball bearing means 70 also serves to transmit radial thrust in combination with the aforementioned radial journaling of the outer end 23 of the pinion shaft 20 in the bushing 72, which is disposed at a spacing from the bearing means 70 for cooperation therewith to provide a bearing couple for transmitting radial thrust from the pinion shaft 20 to the housing 12.

Thus, single radial ball bearings 94 and 70 are advantageously employed throughout the actuator 10 to transmit axial thrust and, in combination with simple radial bushings 82 and 72, to transmit radial thrust without requiring either opposed thrust bearings or cantilever support bearings, which results in a compact, inexpensive, reliable and efficient actuator.

Although in the preferred embodiment of the present invention the above-described bearing arrangements are incorporated in the described self-locking, high-efficiency actuator 10, they may also be utilized to advantage in other actuators of varying efficiencies and with or without self-locking.

In one specific embodiment, the actuator is designed to handle loads up to 500 pounds. The drive motor 14 is a ⅒ horse power permanent magnet, 12-volt direct current motor capable of rotating the drive shaft 16 at a design speed of, for example, 2400 r.p.m. with a 200-pound load. The gear set 22 effects a 20:1 gear reduction to rotate the screw member 24 at a design speed of 120 r.p.m. for a 200-pound load. The axis of the pinion shaft 20 is disposed compactly 0.500″ from the axis of the gear 26 and screw member 24. The screw member 24 is ⅝″ in diameter and has double helix threads 88 dosposed at a helix angle of approximately 15° to provide a 0.500″ lead and a 0.250″ pitch for manipulation of a 200-pound design load at the rate of 60″ per minute. The gear set 22 operates at an efficiency of approximately 80% and the screw and nut members 24 and 28 operate at an efficiency of approximately 70%, which results in an overall operating efficiency of the actuator 10 of approximately 56%.

This actuator 10 is particularly suitable for limited space applications such as for manipulation of garden tractor accessories, for raising and lowering dental chairs, for positioning X-ray equipment, for adjusting hospital beds, and for various other applications.

As described hereinabove, the slef-contained mechanical actuator of the present invention is characterized by high efficiency, compactness, balance and the ability to manipulate loads rapidly and reliably. These characteristics can be obtained according to the present invention with the particular embodiment disclosed and with equivalent variations within the scope of the present invention. The disclosed embodiment has been illustrated and described in detail for purposes of illustration only and the scope of the present invention is not intended to be specifically limited thereto.

I claim:

1. A self-contained mechanical actuator comprising a housing, a drive motor secured to said housing, a drive shaft projecting from said motor into said housing and drivingly rotated by said motor, a skew-axis, screw-type gear set disposed in said housing and having a pinion with worm-like screw teeth and a gear with teeth formed on a generally radial face thereof for multiple tooth, face-meshing engagement with said pinion teeth, said gear set having a pinion shaft carrying said pinion and driven by said drive shaft for driving of said gear set, a screw member secured coaxially to said gear for rotation therewith and against axial movement with respect thereto, said screw member having a helically threaded exterior surface characterized by a relatively high helix angle, a travelling nut member mounted on said screw member and having an interior threaded surface mating with said screw member threaded surface to transmit rotation of said screw member into coaxial movement of said nut member, means mounted on said nut member for attaching a load thereto, and a self-locking transmission mechanism disposed in said housing and interconnecting said drive shaft and said pinion shaft for substantially drag-free transmission of rotation of said drive shaft into rotation of said gear set and connected screw member to manipulate said nut member while substantially preventing any overriding, reversing or rundown rotation of said gear set and screw member independent of the rotation of said drive shaft by said motor.

2. A self-contained mechanical actuator according to claim 1 and characterized further in that said drive shaft and said pinion shaft are coaxially aligned along an axis disposed proximate the axis of said gear and screw member.

3. A self-contained mechanical actuator according to claim 1 and characterized further in that said threaded surfaces of said screw and nut members comprise multiple threads disposed at a high helix angle.

4. A self-contained mechanical actuator according to claim 1 and characterized further in that said drive motor is a reversible electrical motor, and said self-locking transmission mechanism transmits rotation freely from said drive shaft to said pinion shaft in either direction of rotation of said drive shaft while substantially preventing any overriding, reversing or rundown rotation of said gear set and screw member in either direction of rotation independent of the rotation of said drive shaft by said motor.

5. A self-contained mechanical actuator according to claim 1 and characterized further by gear and screw member radial ball bearing means having an outwardly facing inner race secured in relation to said gear and said screw member for rotation therewith and against axial movement with respect thereto and an inwardly facing outer race secured to said housing against axial movement, said bearing means having bearing balls disposed between said inner and outer races for supporting said gear and said screw member for rotation and for transmitting axial thrust in either direction from said screw member and said gear to said housing, said screw member having an end extending beyond said gear and radially journaled in said housing at a spacing from said gear and screw member radial bearing means for cooperation therewith to provide a bearing couple for transmitting radial thrust from said screw member to said housing.

6. A self-contained mechanical actuator according to claim 5 and characterized further by pinion shaft radial ball bearing means intermediate said gear and said drive shaft and having an outwardly facing inner race secured to said pinion shaft for rotation therewith and against axial movement with respect thereto and an inwardly facing outer race secured to said housing against axial movement, said pinion shaft radial ball bearing means having bearing balls disposed between said inner and outer races for supporting said pinion shaft for rotation and for transmitting axial thrust from said pinion shaft to said housing, said pinion shaft having an end extending beyond said gear and radially journaled in said housing at a spacing from said pinion shaft radial bearing means for cooperation therewith to provide a bearing couple for transmitting radial thrust from said pinion shaft to said housing.

7. A self-contained, compact, highly efficient mechanical actuator comprising a housing, a reversible electrical drive motor secured to said housing, a drive shaft projecting from said motor into said housing and drivingly rotated by said motor, a high-efficiency, compact, skew-axis, screw-type gear set disposed in said housing and having a pinion with worm-like screw teeth and a gear with teeth formed on a generally radial face thereof for multiple tooth, face-meshing engagement with said pinion teeth, said gear set having a pinion shaft carrying said pinion and driven by said drive shaft for driving of said gear set, said pinion shaft being coaxially aligned with said drive shaft and proximate the axis of said gear, a screw member having an end secured coaxially to said gear for rotation therewith and against axial movement with respect thereto, said screw member having a double helix screw thread formed on the surface thereof at a relatively high helix angle for high-efficiency operation, a travelling nut member mounted on said screw member and having an interior double helix thread mating with said screw member thread to transmit rotation of said screw member into axial movement of said nut member, means mounted on said nut member for attaching a load thereto, and a self-locking transmission mechanism disposed in said housing and interconnecting said drive shaft and said pinion shatf for substantially drag-free transmission of rotation of said drive shaft in either direction by said reversible motor into corresponding rotation of said gear set and connected screw member to manipulate said nut member while substantially preventing any overriding, reversing or rundown rotation of said gear set and screw member in either direction of rotation independent of the rotation of said drive shaft by said motor.

8. A self-contained mechanical actuator comprising a housing, a drive motor secured to said housing, a drive shaft projecting from said motor into said housing and drivingly rotated by said motor, a gear set disposed in said housing and having a pinion with worm-like screw teeth and a gear with teeth formed on a generally radial face thereof for multiple tooth, face-meshing engagement with said pinion teeth, said gear set having a pinion shaft carrying said pinion and driven by said drive shaft for driving of said gear set, a screw member secured coaxially to said gear for rotation therewith and against axial movement with respect thereto, said screw member having a helically threaded exterior surface, a travelling nut member mounted on said screw member and having an interior threaded surface mating with said screw member threaded surface to transmit rotation of said screw member into axial movement of said nut member, means mounted on said nut member for attaching a load thereto, gear and screw member radial ball bearing means having an outwardly facing inner race secured in relation to said gear and said screw member for rotation therewith and against axial movement with respect thereto and an inwardly facing outer race secured to said housing against axial movement, said bearing means having bearing balls disposed between said inner and outer races for supporting said gear and said screw member for rotation and for transmitting axial thrust in either direction from said screw member to said housing, said screw member having an end extending beyond said gear and radially journaled in said housing at a spacing from said gear and screw member radial ball bearing means for cooperation therewith to provide a bearing couple for transmitting radial thrust from said screw member to said housing.

9. A self-contained mechanical actuator according to claim 8 and characterized further in that said gear has a radial shoulder engaging one end of said inner race of said gear and screw member radial ball bearing means, the thread on said screw member terminates at a spacing from said gear, and an annular retaining element is mounted on said screw member and retained by the end of said screw member thread in engagement with the other end of said inner race of said gear and screw member radial ball bearing means, said retaining element and said gear shoulder retaining said inner race therebetween and transmitting thrust of the screw member and gear to said bearing means in either axial direction.

10. A self-contained mechanical actuator according to claim 8 and characterized further in that said gear and screw member radial ball bearing means serves as the sole means for transmitting axial thrust from said gear and said screw member to said housing.

11. A self-contained mechanical actuator according to claim 8 and characterized further by pinion shaft radial ball bearing means intermediate said gear and said drive shaft and having an outwardly facing inner race secured to said pinion shaft for rotation therewith and against axial movement with respect thereto and an inwardly facing outer race secured to said housing against axial movement, said pinion shaft radial ball bearing means having bearing balls disposed between said inner and outer races for supporting said pinion shaft for rotation and for transmitting axial thrust from said pinion shaft to said housing, said pinion shaft having an end extending beyond said gear and radially journaled in said housing at a spacing from said pinion shaft radial bearing means for cooperation therewith to provide a bearing couple for transmitting radial thrust from said pinion shaft to said housing.

References Cited

UNITED STATES PATENTS 3,449,978   6/1969   Stimpson _____ 74—411.5

LEONARD H. GERIN, Primary Examiner

U.S. Cl. X.R.

74—411.5